(12) United States Patent
Henkel et al.

(10) Patent No.: US 7,686,154 B2
(45) Date of Patent: Mar. 30, 2010

(54) INSPECTION STATION FOR SCREENING HAND LUGGAGE AND OTHER ITEMS CARRIED BY PERSONS

(75) Inventors: Rainer Henkel, Schweppenhausen (DE); Harald Jentsch, Eppstein (DE); Helmut Thoma, Mainz (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 12/189,458

(22) Filed: Aug. 11, 2008

(65) Prior Publication Data
US 2009/0038998 A1   Feb. 12, 2009

Related U.S. Application Data

(63) Continuation of application No. PCT/EP2006/011631, filed on Dec. 5, 2006.

(30) Foreign Application Priority Data
Feb. 9, 2006   (DE) ........................ 10 2006 006 208

(51) Int. Cl.
*B65G 43/08*   (2006.01)
(52) U.S. Cl. ..................... 198/358; 198/347.1; 198/580
(58) Field of Classification Search .............. 198/347.1, 198/358, 348, 349, 351, 370.03, 369.1, 580
See application file for complete search history.

(56) References Cited

U.S. PATENT DOCUMENTS

| | | | | |
|---|---|---|---|---|
| 5,363,951 | A * | 11/1994 | Mensch | 198/606 |
| 6,279,721 | B1 * | 8/2001 | Lyngso et al. | 198/369.2 |
| 6,507,278 | B1 | 1/2003 | Brunetti et al. | |
| 7,270,227 | B2 * | 9/2007 | Bender et al. | 198/358 |
| 2003/0128806 | A1 * | 7/2003 | Morrell | 378/57 |

FOREIGN PATENT DOCUMENTS

| | | |
|---|---|---|
| EP | 1 174 916 A1 | 10/2006 |
| WO | WO 01/05685 | 1/2001 |

\* cited by examiner

*Primary Examiner*—James R Bidwell
(74) *Attorney, Agent, or Firm*—Muncy, Geissler, Olds & Lowe, PLLC

(57) ABSTRACT

In order to check hand luggage and other objects carried by persons, control stations are needed, which have a control unit, in particular an X-ray checking unit, a conveyor which extends through the control unit, a depositing point which is arranged ahead of the conveyor, and a removal point which is arranged behind the conveyor, for the objects and having transport tubs which can be placed onto the conveyor. Small objects and items of clothing are placed in the transport tubs and conveyed through the control unit for checking. A return conveyor for the transport tubs is arranged next to or below the conveyor which passes through the control unit, which return conveyor reaches from the removal point behind the conveyor at least as far as into the region of the depositing point ahead of the conveyor.

20 Claims, 6 Drawing Sheets

The present invention will become more fully understood
INSPECTION STATION FOR SCREENING HAND LUGGAGE AND OTHER ITEMS CARRIED BY PERSONS This nonprovisional application is a continuation of International Application No. PCT/EP2006/011631, which was filed on Dec. 5, 2006, and which claims priority to German Patent Application No. DE 10 2006 006 208.6, which was filed in Germany on Feb. 9, 2006, and which are both herein incorporated by reference.

BACKGROUND OF THE INVENTION

1. Field of the Invention

The present invention relates to an inspection station for screening hand luggage and other items carried by persons, having an inspection unit, in particular an X-ray inspection device, a conveyor extending through the inspection unit for conveying the items through the inspection unit, a deposit point located ahead of the conveyer, and a retrieval point located behind the conveyor for the items, and having transport bins that can be placed on the conveyor, in which small items and articles of clothing are placed and conveyed through the inspection unit for screening.

2. Description of the Background Art

For security screening of hand luggage and other items carried by persons, for example for security screening at airports, it is known to use inspection stations with X-ray inspection devices that transradiate the items. The items to be screened are conveyed on a conveyor, typically a conveyor belt, through the inspection unit, which is run by an operator. Located at the entry side ahead of the conveyor is a roller conveyor, which is used for depositing the items to be screened. In a similar manner, a roller conveyor from which the screened items can be retrieved is located at the output side following the conveyor.

In a known manner, transport bins are used for transporting small items (wallets, cell phones, laptops, small backpacks, etc.) and articles of clothing, with the items being placed in the bins. The transport bins containing the items are placed on the conveyor and are conveyed by it through the inspection unit, in exactly the same way as larger items (briefcases, carry-on bags, etc.). After the screening, the items are removed from the bins by the passengers at the retrieval point. After being emptied, the transport bins must be brought back to the entry of the inspection station. For this purpose, they are either carried back by operating personnel, or are lifted up at the retrieval point and transferred to a non-driven roller section and pushed back on it. All known methods are not ergonomic and place considerable physical and time demands on the operating personnel.

SUMMARY OF THE INVENTION

It is therefore an object of the present invention to provide an inspection station which uses transport bins such that the time and physical demands on the operating personnel are reduced.

This object is attained according to the invention in that a return conveyor for the transport bins is arranged next to or below the conveyor passing through the inspection station, and extends from the retrieval point behind the conveyor to at least the area of the deposit point ahead of the conveyor.

According to the invention, the transport bins are automatically conveyed from the end of the screening section back to the beginning of the screening section. The time and physical demands on the operating personnel are reduced. As a result, the operating personnel can work more efficiently.

The layout and design of the return conveyor for the bins is chosen here such that the bins are transferred to the return conveyor with a minimum expenditure of physical effort and time at the retrieval point of the primary conveyor. Transfer can either be accomplished by service personnel, for example the operator of the inspection station, by the passenger himself, or automatically. During return transport, the bins either lie flat on a conveyor or stand edgewise upon it. Either commensurately wide or narrow roller conveyors, or even belt conveyors, are used for this purpose. Return transport of the bins in the edgewise position has the advantage that a very narrow conveyor can be used which requires very little space. Return transport in the lying position makes it possible to place the return conveyor beneath the inspection unit and [primary] conveyor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 8-11 show three different possibilities for getting the bin from a lying position to a standing position for edgewise return transport, wherein FIGS. 8 and 9 show a downward angled chute for the bins, FIG. 10 shows a chute with a 90° bend meant to be loaded manually; and FIG. 11 shows a table with a downwardly opening flap, upon which the bins slide to the return conveyor.

DETAILED DESCRIPTION

Figure 1:
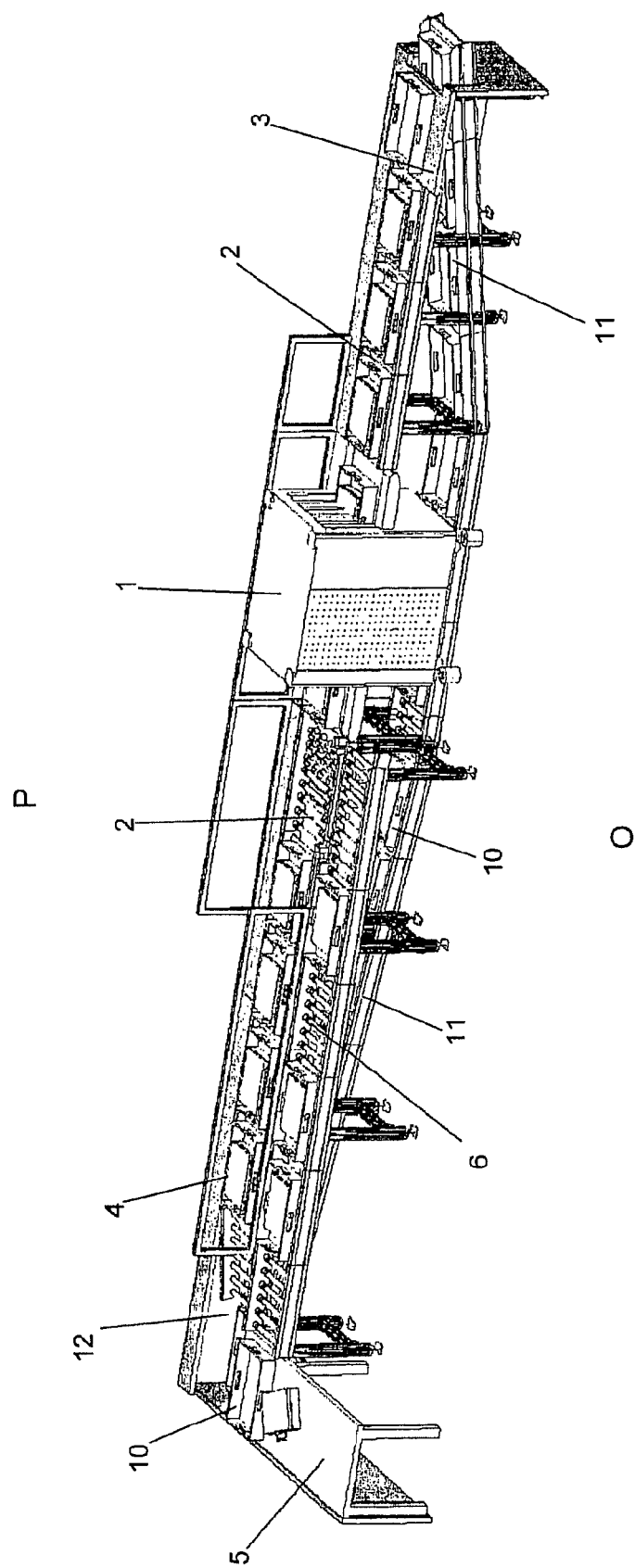
FIG. 1 shows an oblique view of an inspection station with a return conveyor for the transport bins located beneath the inspection unit.

All inspection stations represented in the figures are used for screening hand luggage and other articles carried by persons. They are preferably used for security screening at airports in order to screen passengers' carry-on items for weapons, explosives, or other impermissible items. Each inspection station contains an inspection unit 1, preferably an X-ray inspection device, used to transradiate the carried items. The items to be screened are conveyed on a conveyor 2, preferably a belt conveyor, through the inspection unit. Located at the entry side of the inspection station, ahead of the conveyor 2, is a deposit point 3, upon which the items to be screened are deposited and delivered to the conveyor 2. Customarily, the deposit point 3 has a roller section with freely rotating rollers. At the output side, the conveyor 2 is adjoined by a retrieval point 4, where the passengers retrieve the screened items. The retrieval point 4 also typically has a roller section with freely rotating rollers to which the screened items are delivered from the inspection unit 1 by the conveyor 2. In a known manner, a recheck point 5 is located next to the retrieval point 4, to which the items are delivered by an alternative conveyor 6 behind the inspection unit if the screening by the inspection unit 1 is not clear, so that a manual recheck in the presence of an operator is required.

Located next to the inspection unit 1 on the operator side O is the operator's terminal for the operator, containing a screen which displays the results of the transradiation. The recheck point 5 is likewise located on the operator side, so that the operator can reach it quickly for a follow-up inspection. A switch point 7 in the conveyor section 2, which can be actuated by the operator or automatically, makes it possible to switch over to the conveyor section 6, so that the items are conveyed to the recheck point 5 instead of to the retrieval point 4.

The passengers move through the inspection station on the side P opposite the operator side O. This is the reason the luggage retrieval point 4 is located on the passenger side P.

Transport bins 10 are used for transporting small items (wallets, cell phones, laptops, small backpacks, etc.) and articles of clothing through the inspection unit 1, with these items and articles of clothing being placed in the bins. The transport bins 10 are placed on the rollers of the deposit point 3, where the passengers place the small items and clothing in the bins 10. After the screening in the inspection unit 1, the passengers remove the screened items from the bins 10 again at the retrieval point 4.

All embodiments according to the invention have in common that a return conveyor 11 for the empty transport bins 10 is arranged next to or below the conveyor 2 passing through the inspection unit 1, and extends from the retrieval point 4 to at least the area of the deposit point 3 ahead of the conveyor 2. The transport bins 10 are automatically conveyed from the end of the screening section back to the beginning of the screening section by the return conveyor 11. It is not necessary for an operator to carry the transport bins 10 back or manually push them back on a roller conveyor. The time and physical demands on the operating personnel are thus reduced considerably.

Shown in FIG. 1 is an embodiment in which the return conveyor 11 is arranged to run beneath the conveyor 2 and the inspection station 1. The return conveyor 11 contains driven belts or rollers and has a transport width at least as wide as the transport bins 10. The transport bins 10 can in this way be transported back lying flat, in order to keep the height required beneath the inspection unit 1 and conveyor 2 as small as possible. The transfer point 12 at the end of the screening section, where the emptied bins 10 are transferred by the conveyor 2 to the return conveyor 11, contains either freely rotating or driven rollers. In the case of freely rotating rollers at the transfer point 12, either an operator or the passenger pushes the empty bins 10 onto the return conveyor 11. In the case of driven rollers at the transfer point 12, the transfer can take place automatically, for example initiated by an operator. The transfer of the empty transport bins 10 from the return conveyor 11 to the deposit point 3 at the start of the screening area is either done manually by an operator or the passenger himself, or suitable conveying means that can be activated by an operator are arranged at this point.

Figure 2:
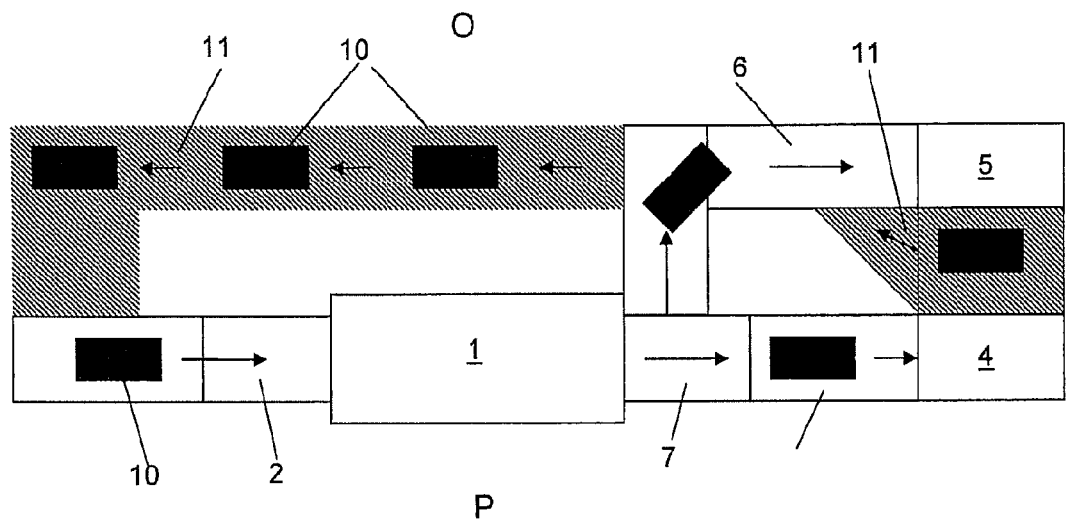
FIG. 2 shows a top view of an embodiment in which the bins are conveyed back in the lying position next to the inspection unit.
Figure 3:
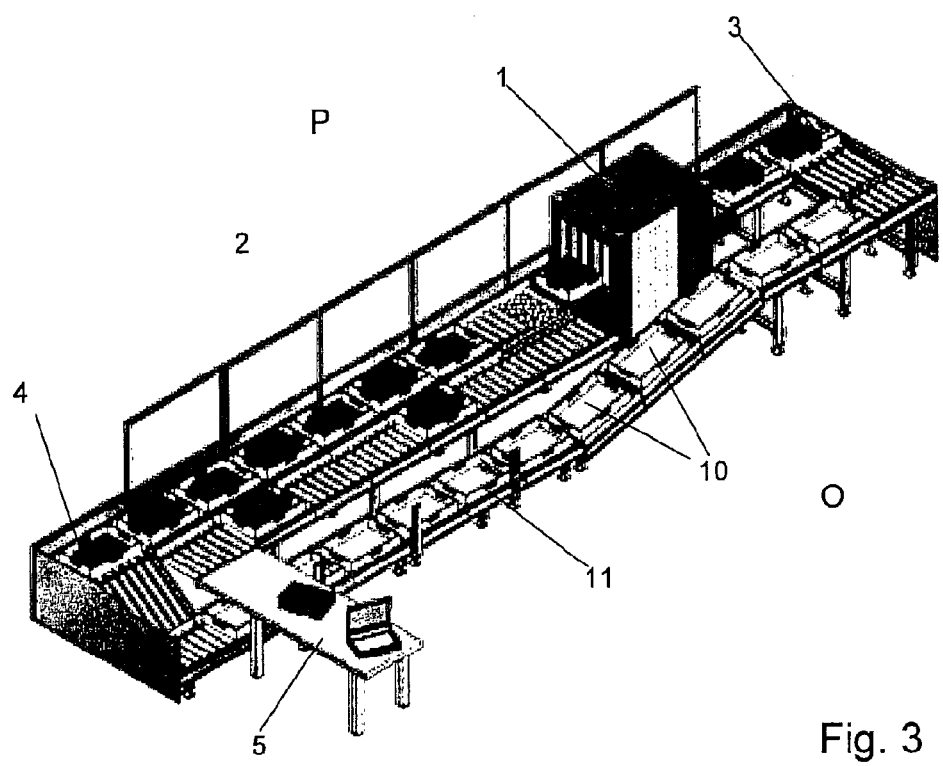
FIG. 3 shows an oblique view of the embodiment from FIG. 2.

Shown in FIGS. 2 and 3 is another embodiment, in which the return conveyor 11 for the bins 10 is arranged to run next to the conveyor 2 on the operator side O. Also shown in both FIGS. 2 and 3 are the recheck point 5 and the switch point 7 with the conveyor 6 leading to the recheck point 5. In this embodiment, too, the bins 10 are transported back lying flat. The return conveyor 11 begins between the retrieval point 4 and the recheck point 5, and initially runs at a level lower than the conveyors 2 and 6. This lower level is drawn with cross-hatching in the figures. Located between the retrieval point 4 and the recheck point 5 is a downwardly angled conveyor surface leading to the return conveyor 11, on which surface the transport bins 10 slide downward to the return conveyor 11. The return conveyor 11 runs on the operator side until it is alongside the deposit point 3. In its final conveying section, it rises to the level of the deposit point 3, so that a bin 10 can simply be pushed from the end of the return conveyor 11 to the deposit point 3.

Figure 4:
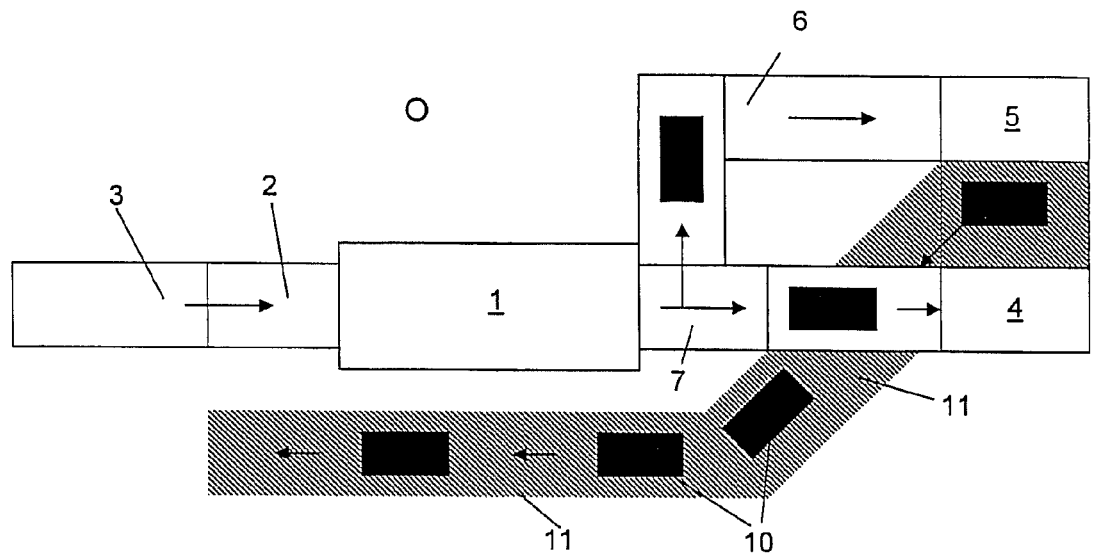
FIG. 4 shows an embodiment in which the bins are conveyed back in the lying position on the passenger side.

In FIG. 4, another embodiment is shown in which the bins 10 are transported back on the return conveyor 11 lying flat. The structure of this inspection station corresponds to that of the inspection station shown in FIGS. 2 and 3, except that the return conveyor 11 for the bins 10 is arranged to run on the passenger side P next to the conveyor 2. In this embodiment, too, the return conveyor begins between the retrieval point 4 and the recheck point 5, below the two conveyors 2, 6 conveying to these locations. The return conveyor 11 initially runs at an angle below the conveyor 2 to the outside on the passenger side P, and is then guided parallel to the conveyor 2, past the inspection unit 1, until it is next to the deposit point 3 at the entry of the inspection station.

Figure 5:
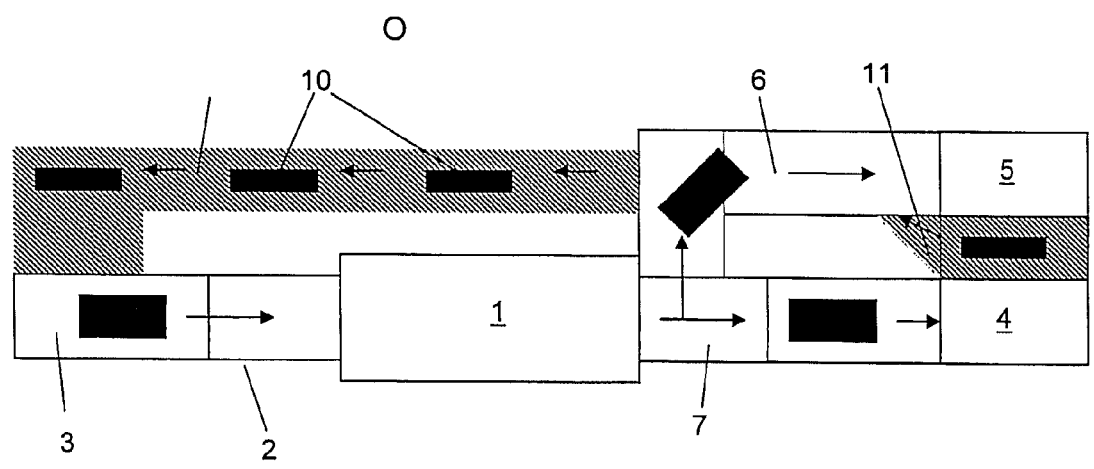
FIG. 5 shows an embodiment in which the bins are conveyed back in the edgewise position on the operator side.
Figure 6:
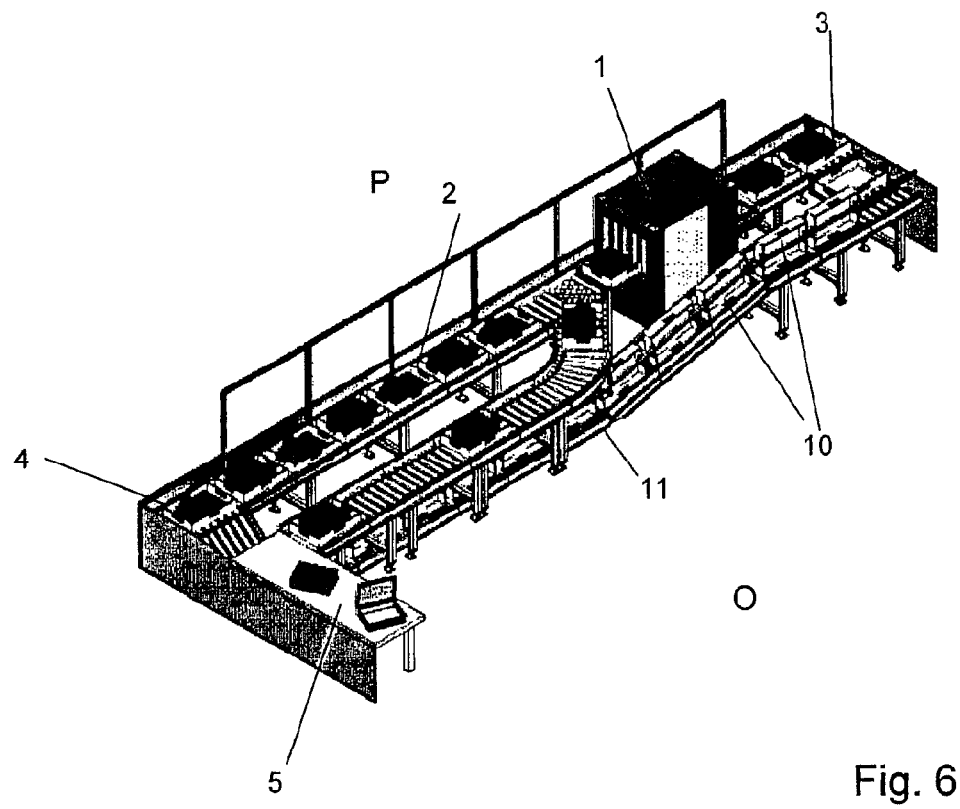
FIG. 6 shows an oblique view of the embodiment from FIG. 5.
Figure 7:
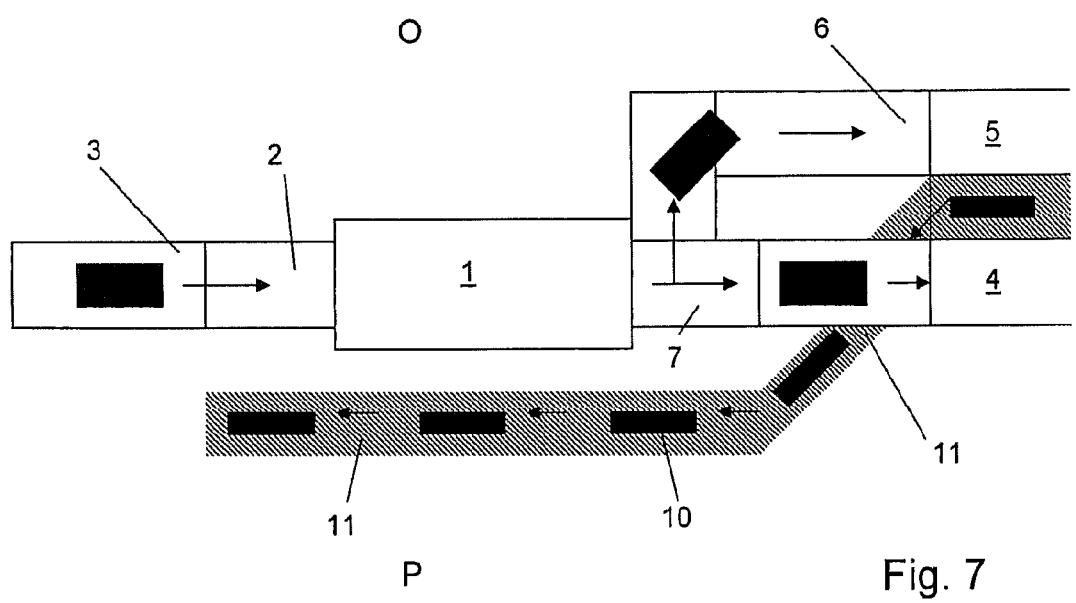
FIG. 7 shows an embodiment in which the bins are conveyed back in the edgewise position on the passenger side.

FIGS. 5-7 show embodiments in which the bins 10 are conveyed back standing edgewise on the return conveyor 11. This has the advantage that very narrow conveyors 11 (belt conveyors or roller conveyors) can be used, which take up very little space. The return conveyor 11 runs next to the conveyor 2 passing through the inspection unit 1. It is located either on the operator side O (FIG. 5, FIG. 6), or on the passenger side P (FIG. 7). The structure of the relevant inspection station corresponds essentially to the embodiments with lying return transport described in FIGS. 1-4. Like parts are thus also labeled with like reference numbers. The embodiments with return transport of the bins 10 in the edgewise position additionally have, at the start of the return conveyor section, means for standing up the bins 10 located either at the retrieval point 4 or at the recheck point 5, and getting them in a position standing edgewise on the return conveyor 11. A variety of these means are shown in FIGS. 8-11.

Figure 8:
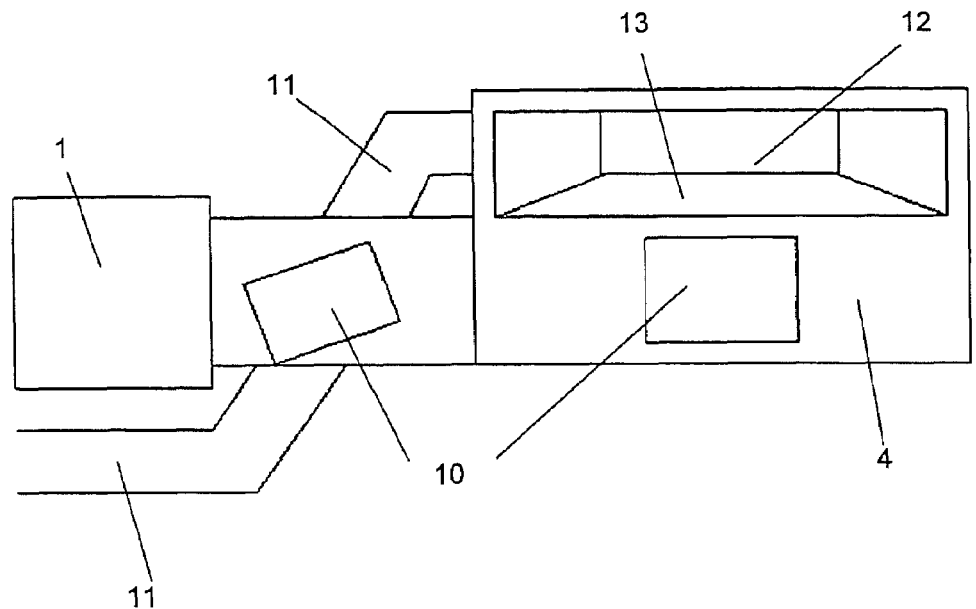
Figure 9:
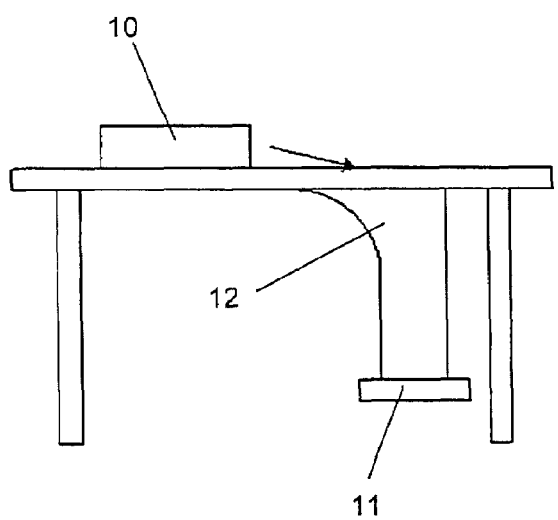

In the embodiment from FIGS. 8 and 9, a chute 12 leads downward from the retrieval point 4 to the narrow return conveyor 11. Within the chute 12, an angled guide surface 13 leads downward and is designed such that a bin 10 sliding down stands on edge, and is placed on the return conveyor 11 in this orientation. The bins 10 are pushed into the chute 12 at the retrieval point 4 either by an operator or by the passenger himself, after it has been verified that no items remain in the bin 10. Alternatively, it is possible to provide a motor drive that conveys a bin 10 into the chute 12. A chute designed as the mirror image is also arranged at the recheck point 5 to move empty bins 10 located there to the return conveyor 11.

Figure 10:
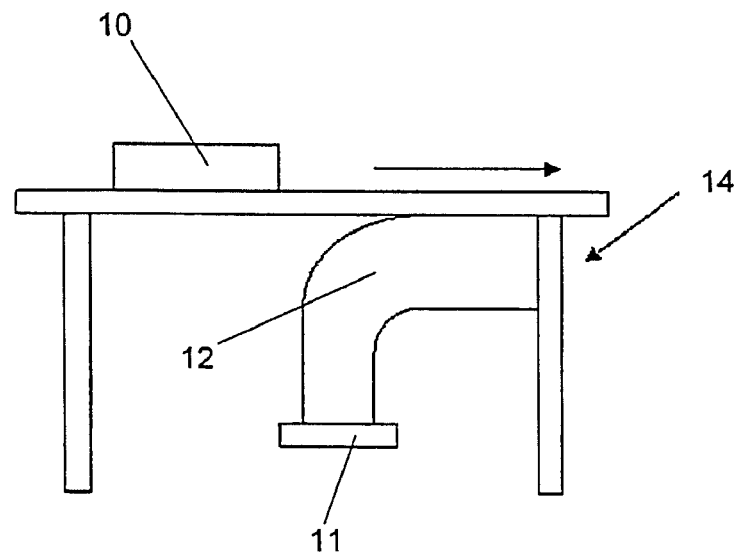

FIG. 10 shows an embodiment that also has a chute 12 with a 90° bend, whose inlet is located on the operator side O between the retrieval point 4 and recheck point 5. The inlet 14 of the chute 12 is located laterally beneath the deposit surface of the retrieval point 4 or recheck point 5. An operator pulls an empty bin 10 towards himself, and inserts it through the inlet 14 into the chute 12. As it moves through the chute 12, the bin 10 is stood up so that it stands edgewise on the return conveyor 11.

Figure 11:
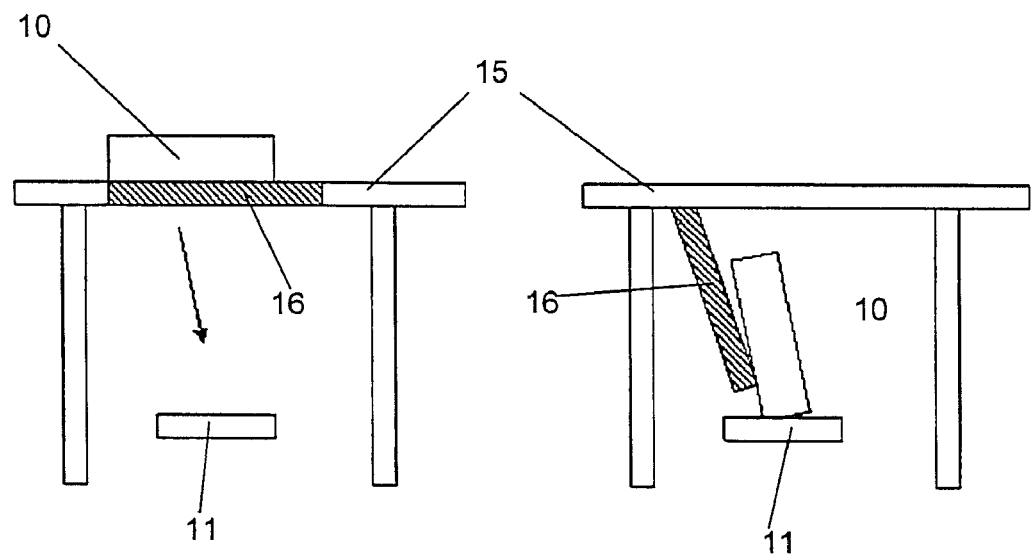

In the embodiment from FIG. 11, a flap 16 that swings downward is located in a deposit surface 15, which is located at the same level as and between the retrieval point 4 and recheck point 5. The flap 16 swings downward in such a way that a bin 10 on it slides downward onto the return conveyor 11, standing itself edgewise in the process. The hinge mechanism for the flap 16 is actuated by an operator when he has determined that the bin 10 has been completely emptied.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inspection station for screening hand luggage and other items carried by persons, the inspection station comprising:
    an inspection unit;
    a conveyor extending through the inspection unit for conveying the items through the inspection unit, said conveyor being configured to convey transport bins in which small items and/or articles of clothing are placed and conveyed through the inspection unit for screening;
    a deposit point located ahead of the conveyer;
    a retrieval point located behind the conveyor for the items;
    a return conveyor for the transport bins arranged next to or below the conveyor passing through the inspection station, the return conveyor extending to the area of the deposit point ahead of the conveyor; and
    a bin support having a conveyor surface, the conveyor surface extending from substantially the retrieval point of the conveyor to the return conveyor.

2. The inspection station according to claim 1, wherein the return conveyor is arranged to run beneath the conveyor and the inspection station.

3. The inspection station according to claim 1, wherein the return conveyor is arranged to run next to the conveyor on an operator side.

4. The inspection station according to claim 1, wherein the return conveyor is arranged to run on a passenger side next to the conveyor.

5. The inspection station according to claim 1, wherein the bins are in a lying position when they are transported on the return conveyor.

6. The inspection station according to claim 1, wherein a recheck station is located next to the retrieval point and can be reached by an automatically or manually actuated switch point.

7. The inspection station according to claim 1, wherein the inspection unit is an X-ray inspection device having an X-ray source and a detector.

8. The inspection station according to claim 1, wherein a sensor is provided at an area of the deposit point for detecting a presence or absence of the transport bin to thereby control the return conveyor.

9. The inspection station according to claim 1, wherein said bin support conveyor surface comprises freely rotating rollers.

10. The inspection station according to claim 1, wherein said bin support conveyor surface comprises driven rollers.

11. The inspection station according to claim 1, wherein said bin support conveyor surface comprises freely rotating or driven rollers.

12. The inspection station according to claim 1 wherein said bin support conveyor surface comprises a chute.

13. The inspection station according to claim 1, wherein said bin support conveyor surface comprises a hinged flap which opens in a downwardly direction to deposit said bins on said return conveyor.

14. An inspection station for screening hand luggage and other items carried by persons, the inspection station comprising:
    an inspection unit;
    a conveyor extending through the inspection unit for conveying the items through the inspection unit, said conveyor being configured to convey transport bins in which small items and/or articles of clothing are placed and conveyed through the inspection unit for screening;
    a deposit point located ahead of the conveyer;
    a retrieval point located behind the conveyor for the items;
    a return conveyor for the transport bins arranged next to or below the conveyor passing through the inspection station, the return conveyor extending substantially from the retrieval point of the conveyor to the area of the deposit point ahead of the conveyor,
    wherein the bins stand edgewise when they are transported on the return conveyor.

15. The inspection station according to claim 14, wherein, an apparatus for taking bins from a lying position and placing them on the return conveyor such that they are standing edgewise is located at a start of the return conveying section.

16. An inspection station for screening hand luggage and other items carried by persons, the inspection station comprising:
    an inspection unit;
    a conveyor extending through the inspection unit for conveying the items through the inspection unit, said conveyor being configured to convey transport bins in which small items and/or articles of clothing are placed and conveyed through the inspection unit for screening;
    a deposit point located ahead of the conveyer;
    a retrieval point located behind the conveyor for the items;
    a return conveyor for the transport bins arranged next to or below the conveyor passing through the inspection station, the return conveyor extending substantially from the retrieval point of the conveyor to the area of the deposit point ahead of the conveyor;
    wherein a recheck station is located next to the retrieval point; and
    wherein said return conveyor is accessible from a point intermediate said retrieval point and said recheck station.

17. The inspection station according to claim 16, wherein the transport bins stand edgewise when they are transported on the return conveyor.

18. The inspection station according to claim 16, including means for taking the transport bins from a lying position and placing them on the return conveyor such that they are standing edgewise.

19. The inspection station according to claim 18 wherein said means for taking transport bins from a lying position comprises a chute.

20. The inspection station according to claim 18 wherein said means for taking transfer bins from a lying position comprises a hinged flap.

* * * * *